United States Patent [19]

Sterkenburg et al.

[11] 4,093,548
[45] June 6, 1978

[54] LIQUID FILTER APPARATUS

[75] Inventors: Jon L. D. Sterkenburg; George O. Kelbert, both of Jacksonville, Fla.

[73] Assignee: Oil Refining Systems of Florida, Inc., Jacksonville, Fla.

[21] Appl. No.: 684,749

[22] Filed: May 10, 1976

[51] Int. Cl.² .............................................. B01D 3/28
[52] U.S. Cl. .................................. 210/180; 196/46.1; 210/350; 210/436
[58] Field of Search ............... 210/111, 180, 189, 282, 210/305, 306, 320, 350, 352, 436; 196/46.1

[56] References Cited

U.S. PATENT DOCUMENTS

| | | | |
|---|---|---|---|
| 2,052,540 | 8/1936 | Delano | 210/305 X |
| 2,072,393 | 3/1937 | Briggs | 210/350 X |
| 2,593,227 | 4/1952 | Wagner | 210/350 X |
| 2,647,634 | 8/1953 | Barton | 210/350 X |
| 2,742,155 | 4/1956 | Sather | 210/350 X |
| 2,765,259 | 10/1956 | Schwalge | 210/350 X |
| 2,935,928 | 5/1960 | Keating et al. | 210/350 X |
| 3,616,885 | 11/1971 | Priest | 210/180 X |
| 4,006,084 | 2/1977 | Priest | 210/180 |

*Primary Examiner*—Theodore A. Granger
*Attorney, Agent, or Firm*—George H. Baldwin; Arthur G. Yeager

[57] ABSTRACT

A piston assembly is disposed between the inlet zone and the filter medium of an apparatus to forcibly compact the filter medium with the same liquid which is being filtered by the liquid filter apparatus thereby to inhibit channeling of the liquid through the filter medium.

15 Claims, 5 Drawing Figures

LIQUID FILTER APPARATUS

BACKGROUND OF THE INVENTION

1. Field of the Invention

This invention relates to a liquid filter apparatus and more particularly to an oil reconditioning and filtering device useable in the lubricating oil system of an internal combustion engine and in industrial oiling systems for various machinery and the like.

2. Description of the Prior Art

This invention is particularly related to improvements over the Oil Reclaimer disclosed in U.S. Pat. No. 3,616,885 and is adaptable for use in the Oil Reconditioning Device disclosed in U.S. Pat. No. 3,915,860 as well as other prior art devices. Among such other prior art disclosures of device are the following U.S. Pat. Nos.: 857,450 — DeLand; 2,088,243 — Koinzan; 2,173,631 — Niedens; 2,207,399 — Goertner; 2,346,042 — 1 Morris; 2,377,988 — Braun; 2,428,939 — Morris; 2,785,109 — Schwalge; 2,839,196 — Schwalge; 3,278,031 — Rosaen; 3,342,340 — Shindell; 3,448,038 — Pall et al.; 3,550,781 — Barrow; 3,616,885 — Priest; 3,617,551 — Johnston et al.; 3,689,407 — Rhodes; and 3,915,860 — Priest. There are many problems with one and another of the above prior art devices, and this invention is directed towards alleviating some of the problems with some of these devices.

Filters which employ loose filter materials, such as cotton or other waste materials that are not closely confined will often experience a problem of channeling of the liquid through and around the material. Oil introduced into a filter will seek the easiest path or paths of flow through the filter material to the outlet. One of these paths often is between the filter material or medium and the canister or housing in which the medium is disposed. Particularly after some use of the filter, but before it is time to replace the filter medium, such a path or channel is established and will tend to enlarge with increased use thereof and most of the liquid or oil will flow therethrough and thus be improperly filtered and/or cause an overflow often when the housing includes an unchecked exhaust passageway or vent, such as that shown in U.S. Pat. No. 3,616,885. The channeling condition seems to occur in an arbitrary manner and may even be in evidence upon the initial use of these types of filters. Another problem occurs with clogging of the small restrictor orifice, normally 1/16 inch to 1/32 inch, which is located between the oil pump and the inlet to the oil reclaimer, such an orifice being used to restrict the flow of oil being introduced into the reclaimer.

In accord with this invention not only is one of the clogging problems alleviated, as by removal of the restrictor oifice, but the channeling problems also are substantially counteracted.

SUMMARY OF THE INVENTION

In accord with this invention a liquid filter apparatus includes a housing, filter medium therein, a liquid inlet zone on one side of the filter medium, a liquid collection zone on another side of the filter medium generally opposite to the one side, and a piston assembly is disposed in the housing between the liquid inlet zone and the filter medium. The piston assembly comprises a rigid plate having a passageway therethrough of a predetermined cross-sectional area, and sealing means attached to the plate for slidingly sealing the plate to the housing so that liquid from the inlet zone will pass through the passageway only. The piston assembly is movable in the direction of the medium to compress the medium when liquid under pressure is introduced into the inlet zone in order that effects of channeling of the liquid through the medium is inhibited.

A general object is to provide an improved liquid filtering apparatus.

A particular object is the provision of a piston assembly within a filer wherein the liquid being filtered provides the force for distribution and compacting of the filter medium.

A specific object is to provide a self-compacting and distributing piston assemby for the loose or bulk pack filter medium to assure proper filtering of contaminants from oil and the like liquids.

A related object is the provision of a self-compacting piston assembly within a filter to minimize channeling of the liquid through the filter medium.

Other objects relate to the appropriate distribution of the liquid throughout the surface area of the filter medium adjacent the liquid inlet zone as well as reducing the possibility of liquid passing outwardly of the housing through the vapor vent.

Additional objects relate to a filter apparatus having a filter medium and piston assembly therein which is simple and economical in construction, rugged and durable in use, and extremely efficient for filtering liquids, and renders the useful life of the filter medium extended primarily by a more uniform distribution of liquid throughout the bottom surface of filter medium and by compacting of the filter medium.

DESCRIPTION OF THE PREFERRED EMBODIMENTS

Figure 1:
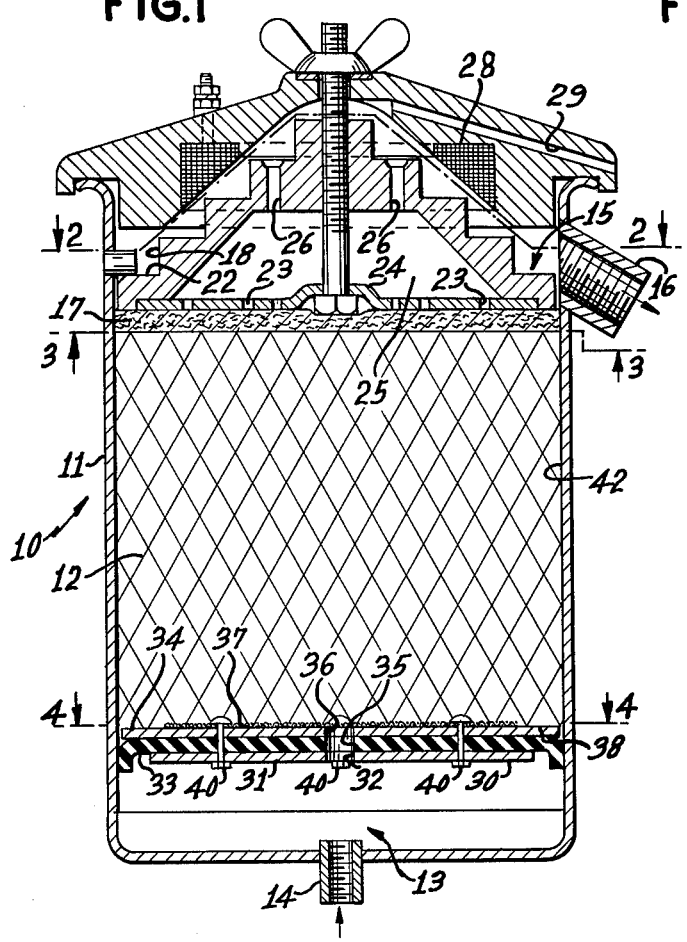

Referring now more particularly to the drawings, the liquid filter apparatus is generally designated by numeral 10 and includes a cylindrical housing 11 with a filter medium 12 therein and disposed in the fluid bath between a liquid inlet zone 13 communicating with inlet 14 and a liquid collection zone 15 communicating with liquid outlet 16. The specific filter shown herein is substantially similar in construction and operation to the Oil Reclaimer disclosed in U.S. Pat. No. 3,616,885 and the details thereof will not herein be repeated. However, a general description thereof will be helpful to provide a clear understanding of the invention. The filter medium 12 is preferably a fibrous long staple cotton filled within a sock or the like and covered by a felt pad 17, such filter medium trapping or filtering out the particulate impurities in the contaminated liquid or oil. The filter medium 12 and pad 17 are engaed against a hollow stepped vaporization plate 18 which locks into the housing by alignment of pins 20 with slots 21 in plate 18 and rotating plate 18 to cause the pins 20 to be engaged onto the bottom step 22 of plate 18, as clearly shown in FIGS. 1 and 2. Liquid in the form of oil to be reclaimed is supplied to inlet zone 13 through inlet 14, through filter medium 12 and pad 17, through openings 23 in the planar member 24, into the hollow 25 of the plate 18, through the passageways 26 extending through the plate 18 and terminating generally at the upper step of plate 18 whereupon the oil flows down over the steps in a thin layer. While the thin layer of oil is flowing over the steps of the plate 18, the oil is exposed to air heated by heater 28 to a temperature of approximately 190° F. Due to the air's elevated temperature, it has a lowered relative humidity and causes substantial amounts of water or volatile material or impurities suspended in the oil to vaporize into this low relative humidity air and exhausted out through a vapor vent 29. The reclaimed oil falls within a liquid collection zone 15 and exits through outlet 16 to an oil reservoir or the like.

In accord with this invention a piston assembly 30 is disposed in housing 11 between the liquid entrance zone 13 and filter medium 12 and includes a rigid plate 31 having passage means in the form of a passageway 32 therethrough of a predetermined cross-sectional area of no more than about one-half square inch, as hereinafter more fully described. Sealing means in form of a flexible rubber or other elastomeric disk 33 is sandwiched between lower plate 31 and upper plate 34 for providing a sliding seal for the piston assembly 30 within housing 30 whereby liquid from the inlet zone 13 will pass through only the passageway 32 of plate 31. As shown, each of rubber disk 33 and upper plate 34 is provided with respective passageway 35 and 36, each of which is generally in alignment with passageway 32 in lower plate 31.

Figure 2:
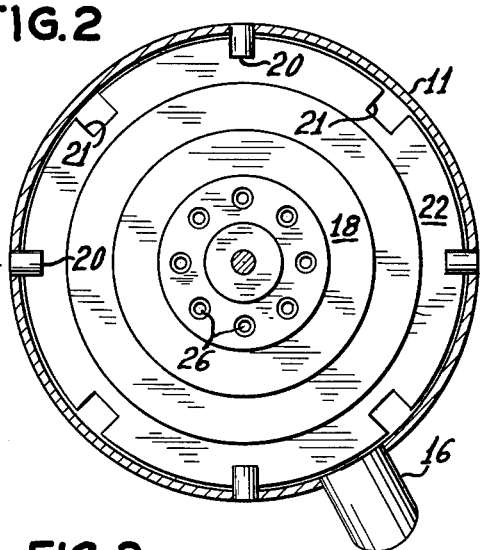
Figure 3:
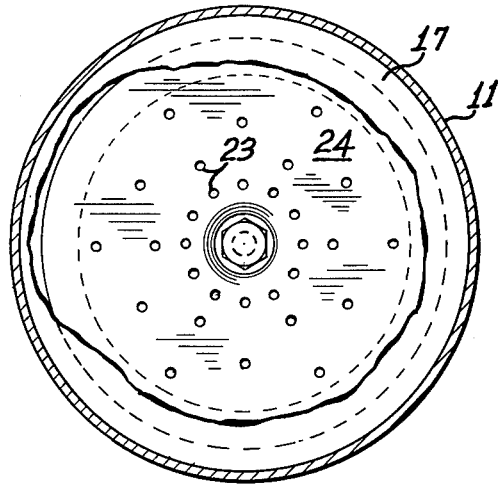

Located beneath filter medium 12 is a foraminous member in the form of one or more medium mesh screens 37 of approximately 30 mesh, screens 37 being shown as disposed above upper plate 34 for dispersing the liquid after exiting from passageways 32, 35, 36 generally throughout the bottom surface 38 of the filter medium 12. Connecting means in the form of spaced nut and bolt fasteners 40 tightly clamp together all of the planar elements to form the piston asembly 30. The assembly 30, by the force exerted against the lower plate 31 by the liquid under pressure, will axially move upwardly, generally on the longitudinal axis of the cylindrical housing 11, toward the filter medium 12 to compress the filter medium while spreading the filter medium and forcing same more uniformly against the inner surface 42 of the housing 11 whenever liquid under pressure is introduced into inlet zone 13. The position of piston assembly 30 as seen in FIG. 1 is substantially as it may appear when a new filter medium 12 is loaded into the housing 11 and with liquid under pressure being applied at inlet 14. The frictional forces between the housing 11 and piston assembly 30 tend to maintain the piston assembly in position although some relaxation of the elastomeric disk 33 may occur.

Each time a liquid pump is turned on to pump liquid through the filter medium 12 substantially any previous channeling of the liquid around or through the filter medium 12 will be inhibited by the piston assembly compressing the filter medium 12. The amount of force the piston assembly generates is primarily determined by the liquid flow rate through passageway 32 (or the most significant restriction of the passageways 32, 35 and 36 assuming that they may differ slightly from each other or be misaligned). As the liquid flows rapidly through passageway 32, differential pressure tends to increase the force applied to the piston assembly 30. Therefore, in the event that channeling should begin to permit too great a flow through the filter medium 12, the liquid flow therethrough would increase and the upward force on the piston assembly 30 would increase the packing of the filter medium 12 to inhibit such channeling, thus providing an automatic compensating and self-compacting piston assembly 30 for the liquid filter apparatus 10.

The basic equation for a sharp orifice flow or the flow through passageway 32 can be expressed as, $Q = C_d A_o \sqrt{(2 \times \Delta P)/\rho}$, where $Q$ = flow (in.³/sec.); $C_d$ = orifice coefficient; $A_o$ = area of orifice (in.²); $\Delta P$ = pressure differential across orifice (lbs/in.²) $\rho$ = Density of fluid passing through the orifice (lb. − sec.²)/(in.⁴). Solving for $\Delta P = Q^2/(2C_d^2 A_o^2)$ The force on the piston assembly 30 may be expressed a $F_p = \Delta P\, A_p$ or $\Delta P\, R_p^2\, \pi$; where $F_p$ is the plate thrust (lbs.); $A_p$ is the plate area (in.²); and $R_p$ is the plate radius (in.).

Combining these qwo equations results in $F_p = \pi \rho Q^2 R_p^2/2\, C_d^2\, A_o^2$. The numerical value of the orifice coefficient $C_d$ was determined empirically under steady state conditions since the sharp edge orifice configuration for the validity of the first equation may not be present in the herein disclosed piston assembly 30 primarily because of the screen 37 overlying the orifice or passageway 32 (or the continuation thereof by passageways 35 and/or 36). The $C_d$ for a sharp edge orifice would be 0.611 whereas the orifice coefficient being achieved by the instant orifice is about 0.78. Of course, the actual coefficient would be somewhat dependent upon the density of the filter media, for example, the cotton density as well as the packing factor or amount of cotton within the housing.

As hereinabove set forth, the cross-sectional area of the passageway 32 for the size of the piston, namely a piston having a diameter of about six inches, should be no more than about one-half square inch and preferably about one-fourth square inch. However, the ratio of the diameter of the passageway with respect to the diameter of the piston may be between about one to ten and one to fifty dependent on many variables, such as, the density of the cotton filtering medium, size of the piston, desired compaction rate, physical characteristics and temperature of the liquid to be filtered, etc.

Figure 5:
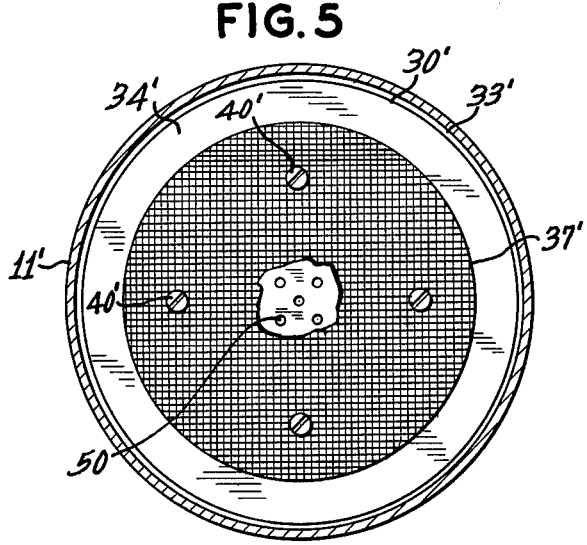
Figure 4:
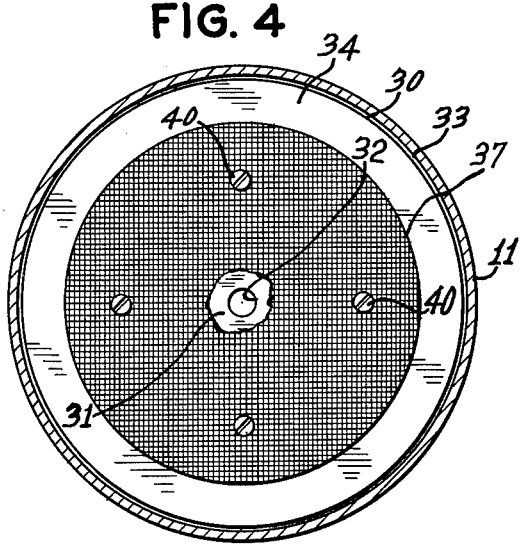

In FIG. 5, the passage means is in the form of a plurality of small passageways 50 extending through the piston assembly 30', rather than the single passageway 32 of FIGS. 1–4, but the total cross-sectional areas of the small passageways 50 should be no more than the aforementioned cross-sectional area of passageway 32. While the plurality of passageways 50 may provide some advantages, for example, a more uniform distribution of the liquid flowing from the inlet zone 13 through the filter medium, an attendant disadvantage would probably result because such passageways 50, being smaller, would be more subject to clogging and the like. The passageway 32 or passageways 50 are designed to be as large as possible while providing the required thrust function ascribed to the piston assembly 30 to pack and even may slightly repack the filter medium 12 each time liquid under pressure is applied therebeneath while retaining the filter medium 12 in packed condition during liquid filtering operations.

When channeling begins, the differential pressure across the piston assembly 30 increases to cause the piston assembly to move upwardly to alleviate such channeling. This self-adjusting feature of the piston assembly 30 has an attendant benefit in that as the filter tends to clog by debris and foreign materials inhibiting normal liquid flow through the filter medium, the differential pressure across the piston assembly decreases whereby the upward force on the piston assembly decreases, compaction of the filter medium is reduced and the liquid being filtered will tend to flow more readily. Thus it is seen, that the filter apparatus incorporating the piston assembly 30 in accord with this invention provides a more uniform and controlled filtering function over the life of the filter medium thereby effectively extending the useful life thereof.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a liquid filter apparatus having a housing with a side wall connecting between an upper portion and a bottom portion and with an inlet located in one of said portions and an outlet located in the other of said portions, a first rigid perforated plate fittingly disposed in said other end portion of said housing, a second rigid plate slidingly arranged in said one end portion of said housing, filter media for filtering fluid located in said housing between said plates, means for maintaining said first plate spaced from said outlet against the force of said filter media thereagainst, said second plate being disposed between said filter media and said inlet and having one face engaging said media and an opposite face facing said inlet and being constructed and arranged to sealingly slide along the interior surface of said side wall of said housing, said second plate having an aperture therethrough located spacedly inwardly of said side wall for the flow of fluid through said aperture to said filter media whereby, with channeling of said filter media and pressure drop within the interior of said filter media, fluid pressure on said opposite face of said second plate causes said second plate to slide in the direction toward said filter media to compress the filter media against said first plate and to close the channels causing such pressure drop.

2. In the apparatus as defined in claim 1 further comprising sealing means being defined by an elastomeric disk attached to said second plate, said disk having an aperture therethrough generally aligned with said aperture in said second plate for the passage of fluid therethrough.

3. In the apparatus as defined in claim 1 further comprising a third rigid plate spaced away from said second plate, said sealing means being defined by an elastomeric disk positioned between said second and third plates and sandwiched therebetween, each of said disk plates and said third plate having passage means therethrough generally aligned with said aperture of said second plate.

4. In the apparatus as defined in claim 3 further comprising means for connecting said second and third plates to said disk.

5. In the apparatus as defined in claim 1 further comprising a foraminous member disposed beneath said filter media for dispersing the liquid after passing through said aperture generally throughout the bottom surface of said filter media.

6. In the apparatus as defined in claim 5 wherein said foraminous member is connected to said second plate.

7. In the apparatus as defined in claim 1 further comprising a third rigid plate spaced away from said second plate and having a passage means therethrough generally aligned with said aperture, a foraminous member disposed beneath said filter media for dispersing the fluid after passing through both of said passage means and aperture generally throughout the bottom surface of said filter media.

8. In the apparatus as defined in claim 7 further comprising sealing means defined by an elastomeric disk positioned between said second and third plates and having passage means in general alignment with both of said aperture and passage means.

9. In the apparatus as defined in claim 8 further comprising means for connecting said first and second and third plates, and said disk and foraminous member together thereby forming a unitary piston assembly.

10. In the apparatus as defined in claim 1 wherein said aperture is defined by a single passageway.

11. In the apparatus as defined in claim 1 wherein said aperture is defined by a plurality of spaced passageways.

12. In the apparatus as defined in claim 1 wherein said aperture diameter relative to the diameter of said second plate is between the ratio of 1 to 10 and 1 to 50.

13. In the apparatus as defined in claim 1 wherein said filter media is subject to channeling effects through the media and between said filter media and said housing, said second plate moving toward said first plate to compress and redistribute the filter media whenever increasing flow of fluid through said filter media occurs thereby resulting in a differential pressure increase across said second plate which forcibly drives said second plate to close the channels in said filter media.

14. In the apparatus as defined in claim 1 wherein said second plate is tightly fitted within said housing whereby said second plate will substantially remain in its position with respect to said filter media when fluid under pressure is substantially terminated from being introduced into said inlet.

15. In the apparatus of claim 1 wherein said first plate has perforations less restrictive to flow of fluid therethrough than said passageway means of said second plate.

* * * * *